United States Patent
Zhou et al.

(10) Patent No.: US 6,584,051 B1
(45) Date of Patent: Jun. 24, 2003

(54) METHODS OF DETERMINING THE OPTIMAL ERASE AND WRITE POWER, AND RECORDING APPARATUS WITH DEVICES FOR SAID METHODS

(75) Inventors: Guo-Fu Zhou, Eindhoven (NL); Roel Van Woudenberg, Eindhoven (NL); Johannes H. M. Spruit, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/623,829

(22) PCT Filed: Jan. 6, 2000

(86) PCT No.: PCT/EP00/00094

§ 371 (c)(1),
(2), (4) Date: Sep. 8, 2000

(87) PCT Pub. No.: WO00/41172

PCT Pub. Date: Jul. 13, 2000

(30) Foreign Application Priority Data

Jan. 8, 1999 (EP) .............................................. 99200041

(51) Int. Cl.[7] .................................................. G11B 7/00
(52) U.S. Cl. .................. 369/47.51; 369/116; 369/47.53
(58) Field of Search .............................. 369/116, 47.51, 369/47.53, 53.37

(56) References Cited

U.S. PATENT DOCUMENTS 5,888,680 A * 3/1999 Ohbayashi et al. ......... 369/116

FOREIGN PATENT DOCUMENTS

EP        0737962 A2     10/1996

* cited by examiner

Primary Examiner—Nabil Hindi
(74) Attorney, Agent, or Firm—Michael E. Belk (57) ABSTRACT

The application relates to methods and devices for determining the optimal erase (17) and write powers for erasing and writing information on an optical record carrier (85). These optimal powers are determined from two powers, $P_{min}$ (15) and $P_{max}$ (16), found at specific points, (22) and (24), in a curve (10) where the normalized reflected power (12) is plotted versus the test power (11).

20 Claims, 5 Drawing Sheets

METHODS OF DETERMINING THE OPTIMAL ERASE AND WRITE POWER, AND RECORDING APPARATUS WITH DEVICES FOR SAID METHODS

The invention relates to a method of determining the optimal erase power for erasing marks provided in an optical record carrier of the type in which marks are provided by locally heating the record carrier with radiation pulses having a sufficiently high power so as to cause changes in optical properties of the record carrier, which changes become manifest by a reduced reflection of the radiation pulses.

The invention also relates to a method of determining the optimal write power for providing marks in an optical record carrier, which marks are provided by locally heating the record carrier with radiation pulses having a sufficiently high power so as to cause changes in optical properties of the record carrier, which changes become manifest by a reduced reflection of the radiation pulses.

The invention further relates to an optical record carrier for use in one of the methods according to the invention, inscribable by a radiation beam, containing an area comprising information about properties of the optical record carrier.

The invention further relates to a recording apparatus comprising a calibration device for determining the optimal erase power required for erasing marks provided in an optical record carrier of the type in which marks are provided by locally heating the record carrier with radiation pulses having a sufficiently high power so as to cause changes in optical properties of the record carrier, which changes become manifest by a reduced reflection of the radiation pulses.

The invention further relates to a recording apparatus comprising a calibration device for determining the optimal write power required for providing marks in an optical record carrier, which marks are provided by locally heating the record carrier with radiation pulses having a sufficiently high power so as to cause changes in optical properties of the record carrier, which changes become manifest by a reduced reflection of the radiation pulses.

The invention also relates to a calibration device for use in a recording apparatus.

The optimal erase power and the optimal write power are dependent on properties of the record carrier used and on the properties of the recording apparatus. These powers should therefore be determined whenever a given record carrier is used in a recording apparatus.

Methods and apparatuses for determining these powers are known, inter alia, from EP 0 737 962 (Ricoh Company Ltd). This application describes a method in which the optimal write power is determined with reference to a modulation power curve to be fixed for each combination of record carrier and recording apparatus. The modulation power curve is fixed by providing marks in the record carrier through a large range of write powers ($P_w$) and by subsequently measuring the modulation (m) of the associated marks for each write power, i.e. the reflected power coming from a mark relative to the reflected power coming from an area without marks. The modulation values thus obtained are plotted versus the associated write powers in the modulation power curve ($m(P_w)$). Subsequently, a curve (the $\gamma$ curve) is determined which represents the normalized first-order derivative ($y=(dm/dP_w)\cdot(P_w/m)$) of the modulation power curve ($m(P_w)$) described hereinbefore. This $\gamma$ curve has an asymptotic variation, with only a slight decrease of the y occurring at higher write powers. The optimal write power is found by selecting the power which is associated with a predetermined value of the derivative $\gamma$. The optimal erase power is subsequently linearly dependent on the optimal write power found.

The determination of an unambiguous value from an asymptotically varying curve, such as the $\gamma$ curve, is not very well possible. Small variations of the input value, the predetermined value of $\gamma$, may result in large variations of the output value, the optimal write power. Moreover, when determining the modulation power curve, write powers are used which lie above the optimal write power so that unnecessarily high temperatures are caused in the record carrier.

It is an object of the invention to provide a method of unambiguously determining the optimal erase power and to provide a method of unambiguously determining the optimal write power, avoiding unnecessarily high temperatures in the record carrier.

According to the invention, this object is achieved by means of a method of determining the optimal erase power, which is characterized in that the method comprises a preparatory step of providing marks on the record carrier by locally heating the record carrier with radiation pulses having a first power, followed by a first measuring step of determining a second power ($P_{min}$) of the radiation pulses, at which power the optical properties of the record carrier at the location of the marks provided in the preparatory step do not substantially change when the record carrier is irradiated at a power which is lower than said second power, and the optical properties of the record carrier at the location of the provided marks change when the record carrier is irradiated at a power which is higher than said second power, such that the normalized reflected power increases, and a second measuring step of determining a third power ($P_{max}$) of the radiation pulses, at which power the optical properties of the record carrier change to such an extent that the normalized reflected power becomes maximal, when the record carrier is irradiated at said third power at the location of the marks provided in the preparatory step, followed by a comparison step of determining the optimal erase power ($P_{EO}$) from the equation $$P_{EO} = \beta \cdot \frac{(P_{min} + P_{max})}{\alpha}$$

in which $\alpha$ is a constant known in advance and $\beta$ is a variable which is dependent on properties of the record carrier. The normalized reflected power (R) is understood to mean the reflected power relative to the power at which the record carrier is irradiated.

An advantage of this method is that the powers $P_{min}$ and $P_{max}$ to be determined, from which the optimal erase power follows via an equation, can be unambiguously determined because they are located at points of inflection in a curve in which the normalized reflected power (R) is plotted versus the power (P) at which the record carrier is irradiated at the location of the marks provided in the preparatory step. This means that the first-order derivative dR/dP exhibits an abrupt variation in value or sign at the powers $P_{min}$ and $P_{max}$ so that these powers can be determined in a simple and unambiguous manner. A further advantage of the method appears to be that the determined powers, $P_{min}$ and $P_{max}$, are hardly dependent on the write method with which the marks are provided on the record carrier in the preparatory step. Also the number of times of consecutively performing the method, in which marks are each time provided at the same position on the record carrier, has no significant influence on the determined powers $P_{min}$ and $P_{max}$.

According to the invention, this object is further achieved by means of a method of determining the optimal write power, which is characterized in that the method comprises a preparatory step of providing marks on the record carrier by locally heating the record carrier with radiation pulses having a first power, followed by a first measuring step of determining a second power ($P_{min}$) of the radiation pulses, at which power the optical properties of the record carrier at the location of the marks provided in the preparatory step do not substantially change when the record carrier is irradiated at a power which is lower than said second power, and the optical properties of the record carrier at the location of the provided marks change to such an extent that the normalized reflected power increases, when the record carrier is irradiated at a power which is higher than said second power, and a second measuring step of determining a third power ($P_{max}$) of the radiation pulses, at which power the optical properties of the record carrier change when the record carrier is irradiated at said third power at the location of the marks provided in the preparatory step, such that the normalized reflected power becomes maximal, followed by a comparison step of determining the optimal write power ($P_{WO}$) from by the equation $$P_{WO} = \delta \cdot \beta \cdot \frac{(P_{min} + P_{max})}{\alpha}$$

in which $\alpha$ is a constant known in advance and $\beta$ and $\delta$ rare variables which are dependent on properties of the record carrier.

Also in this method, the powers, $P_{min}$ and $P_{max}$, can be unambiguously determined because they are located at points of inflection in a curve in which the normalized reflected power (R) is plotted versus the power (P) at which the record carrier is irradiated at the location of the marks provided in the preparatory step, and the determined powers, $P_{min}$ and $P_{max}$, are hardly dependent on the write method and on the number of times of performing the method.

The methods described are applicable, inter alia, when using optical record carriers of the "phase change" type, in which marks are provided in the record carrier by locally heating the record carrier, under the influence of which a local transition takes place from a crystalline state to an amorphous state, and vice versa.

An embodiment of the method according to the invention is characterized in that the first measuring step comprises at least two sub-steps, in which sub-steps the record carrier is irradiated at the location of the provided marks with radiation pulses having a test power of a selected value, which test power increases in the consecutive sub-steps as long as the optical properties of the record carrier at the location of the irradiated marks do not substantially change, and which sub-steps are terminated as soon as the optical properties of the record carrier at the location of the irradiated marks change to such an extent that the normalized reflected power increases, followed by a first final step in which the value of the test power in the last sub-step is allocated to the second power ($P_{min}$).

An advantage of this embodiment is that the sequence of consecutive sub-steps is terminated by a clear stop criterion because the normalized reflected power upon irradiation at a test power just above the second power ($P_{min}$) exhibits a fairly abrupt increase with respect to the normalized reflected power upon irradiation at a test power just below the second power ($P_{min}$).

An embodiment of the method according to the invention is characterized in that the second measuring step comprises at least two sub-steps, in which sub-steps the record carrier is irradiated at the location of the provided marks with radiation pulses having a test power of a selected value, which test power increases in the consecutive sub-steps and which sub-steps are terminated as soon as the optical properties of the record carrier at the location of the irradiated marks change to such an extent that the normalized reflected power decreases, followed by a second final step in which the value of the test power in the last sub-step is allocated to the third power ($P_{max}$).

An advantage of this embodiment is that the sequence of consecutive sub-steps is terminated by a clear stop criterion because the normalized reflected power upon irradiation at a test power just above the third power ($P_{max}$) exhibits a fairly abrupt decrease with respect to the normalized reflected power upon irradiation at a test power just below the third power ($P_{max}$). A further advantage of this embodiment is that the test powers do not become higher than the minimal power which is required for providing marks. Consequently, the record carrier is not irradiated with radiation pulses having an unnecessarily high test power, so that no unnecessarily high temperatures are caused in the record carrier.

An embodiment of the method according to the invention is characterized in that the marks, which are provided in the preparatory step, are of a maximum length which maximum length is the maximum length allowed by the applied coding method.

In this embodiment, the longest possible marks are provided which are allowed within the scope method. For example, a mark with a length of (d+1) times the channel-bit-length (.e., a I(d+I) carrier) is provided when a (d,k) RLL coding method is applied.

The length of these longest possible marks is at least larger than the diameter of the cross-section of the beam of radiation pulses with respect to the record carrier. An advantage of this embodiment is that, due to the provision of these marks, a maximally unambiguous transition in normalized reflected power (R) is obtained between a mark and an area without marks. This is particularly important where the optical properties of a record carrier at the location of a mark differ only slightly from the optical properties in an area without marks.

An embodiment of the method according to the invention is characterized in that the marks, which are provided in the preparatory step, are coded with an I11 carrier in accordance with the EFM+ (Eight-to-Fourteen Modulation Plus) coding method.

In this embodiment, the longest possible marks are provided which are possible within the scope of the EFM+ coding method, which method is used, inter alia, in DVD systems.

An embodiment of the method according to the invention is characterized in that the marks, which are provided in the preparatory step, are provided in selected distinguishable areas.

For example, the marks may be provided in a limited number of sectors of a track. An advantage of this embodiment is that the measuring steps can be performed more rapidly than when the marks are provided in larger areas such as, for example, a complete track.

An embodiment of the method according to the invention is characterized in that the selected distinguishable areas are evenly spread across the surface of the record carrier.

An advantage of this embodiment is that irregularities in the optical properties of the record carrier, which are not evenly spread across the surface of the record carrier, have a smaller influence on the results of the measuring steps than in the case where the distinguishable areas are not evenly spread across the surface of the record carrier. By using areas which are evenly spread across the surface of the record carrier, optimal values for the erase power and the write power applying to the entire record carrier are found.

An embodiment of the method according to the invention is characterized in that the factor a in the comparison step has a value of 2.

Although it is evident to those skilled in the art that the factor a may assume any value between $(P_{min}+P_{max})/P_{min}$ and $(P_{min}+P_{max})/P_{max}$, it was found in measurements that at a value of 2 for the factor of α, the method yields a good approximation of the optimal erase power and write power if β is assumed to be ≈1.

An embodiment of the method according to the invention is characterized in that the factor a in the comparison step has a value of 2 and the factor β in the comparison step has α value of between 0.7 and 1.3.

Measurements proved that a value of β in said range appeared to yield an optimal value for the erase power and the write power, with the value for β at which these optimal values are reached being dependent on the properties of the record carrier used.

An embodiment of the method according to the invention is characterized in that the factor β in the comparison stage is read from an area on the record carrier, which area comprises information about properties of the record carrier.

Since the value for β, at which the optimal values for the erase power and the write power are reached, is dependent on the properties of the record carrier used, this value can be determined once during the production of the record carrier and fixed on this record carrier.

It is a further object of the invention to provide an optical record carrier for use in one of the methods according to the invention.

An optical record carrier according to the invention is characterized in that the area comprising information about properties of the record carrier comprises a value for the factor β used in the comparison stage of the method according to the invention.

An optical record carrier according to the invention is characterized in that the area comprising information about properties of the record carrier comprises a value for the factor δ used in the comparison stage of the method according to the invention.

Since the value for β, respectively δ, at which the optimal values for the erase power and the write power are reached is dependent on the properties of the record carrier, this value can be determined once during the production of the record carrier and can subsequently be stored in an area on the record carrier comprising information about properties of the record carrier.

Such an area is for example the so-called pregroove in the lead-in area on a Compact Disk Recordable (CD-R). This pregroove is frequency-modulated with an auxiliary signal and information about properties of the record carrier are coded in the auxiliary signal. A description of a record carrier having such information recorded in the pregroove may be found in EP 0 397 238. Another example of such an area is a control area on a record carrier, which record carrier is divided in an information recording area for writing user information, and a control area for storing information relevant for writing, reading and erasing information on the record carrier. A encoded value for β, respectively δ, may be stored as a pattern of arks in this control area. The control area may be embossed.

Recording media of a different type, such as for example an optical type, may be provided with information about properties of the record carrier in a different manner, for example, by arranging an area comprising information about properties of the optical record carrier at the beginning of the tape or along an auxiliary track.

Other information about properties of the record carriers which could be stored in the area on the record carrier comprising information about properties of the record carrier include for example one or more speeds of recording, fixed power levels of the radiation beam used during the recording, such as a bias power level, and the duration and duty cycles of radiation pulses.

An embodiment of the method according to the invention is characterized in that the factor δ in the comparison step is read from an area on the record carrier, which area comprises information about properties of the record carrier.

Since the value for δ, at which the optimal value for the write power is reached, is dependent on the properties of the record carrier used, this value can be determined once during the production of the record carrier and fixed on this record carrier.

It is a further object of the invention to provide a recording apparatus using the method of determining the optimal erase power, and a recording apparatus using the method of determining the optimal write power.

A recording apparatus according to the invention is characterized in that the calibration device is adapted to provide marks on the record carrier by locally heating the record carrier with radiation pulses having a first power, and to determine a second power ($P_{min}$) of the radiation pulses, at which power the optical properties of the record carrier at the location of the provided marks do not substantially change when the record carrier is irradiated at a power which is lower than said second power, and the optical properties of the record carrier at the location of the provided marks change when the record carrier is irradiated at a power which is higher than said second power, such that the normalized reflected power increases, and to determine a third power ($P_{max}$) of the radiation pulses, at which power the optical properties of the record carrier change to such an extent that the normalized reflected power becomes maximal, when the record carrier is irradiated at said third power at the location of the provided marks, and to determine the optimal erase power ($P_{EO}$) from the equation $$P_{EO} = \beta \cdot \frac{(P_{min} + P_{max})}{\alpha}$$

in which α is a constant known in advance and β is a variable which is dependent on properties of the record carrier.

A recording apparatus according to the invention is characterized in that the calibration device is adapted to provide marks on the record carrier by locally heating the record carrier with radiation pulses having a first power, and to determine a second power ($P_{min}$) of the radiation pulses, at which power the optical properties of the record carrier at the location of the provided marks do not substantially change when the record carrier is irradiated at a power which is lower than said second power, and the optical properties of the record carrier at the location of the provided marks change to such an extent that the normalized reflected power increases, when the record carrier is irradiated at a power which is higher than said second power, and to determine a third power ($P_{max}$) of the radiation pulses, at which power the optical properties of the record carrier change when the record carrier is irradiated at said third power at the location of the provided marks, such that the normalized reflected power becomes maximal, and to determine the optimal write power ($P_{WO}$) from the equation $$P_{WO} = \delta \cdot \beta \cdot \frac{(P_{\min} + P_{\max})}{\alpha}$$

in which $\alpha$ is a constant known in advance and $\beta$ and $\delta$ are variables which are dependent on properties of the record carrier.

These and other aspects of the invention are apparent from and will be elucidated with reference to the embodiments described hereinafter.

Figure 1:
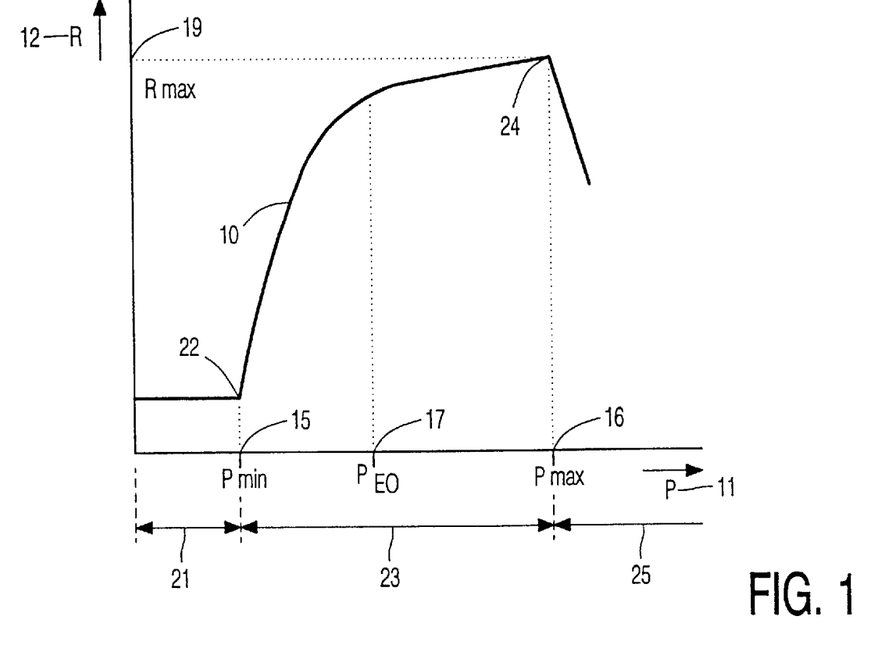
FIG. 1 is a graph showing diagrammatically the relation between the normalized reflected power (R) and the test power (P) at which the record carrier is irradiated at the location of the marks provided in the preparatory step.

The curve (10) in FIG. 1 shows diagrammatically the relation between the test power, P, at which the record carrier is irradiated (11) at the location of the marks provided in the preparatory step, and the normalized reflected power, R, (12). The second power, $P_{min}$, (15) is the power at which the curve has a point of inflection (22) located between an area having a substantially constant normalized reflected power (21) and an area having an increasing normalized reflected power (23). The third power, $P_{max}$, (16) is the power at which the normalized reflected power is maximal, $R_{max}$, (19). This is also the power at which the curve has a point of inflection (24) located between an area having an increasing normalized reflected power (23) and an area having a decreasing normalized reflected power (25). The optimal erase power (17) is between $P_{min}$ (15) and $P_{max}$, (16).

Figure 2:
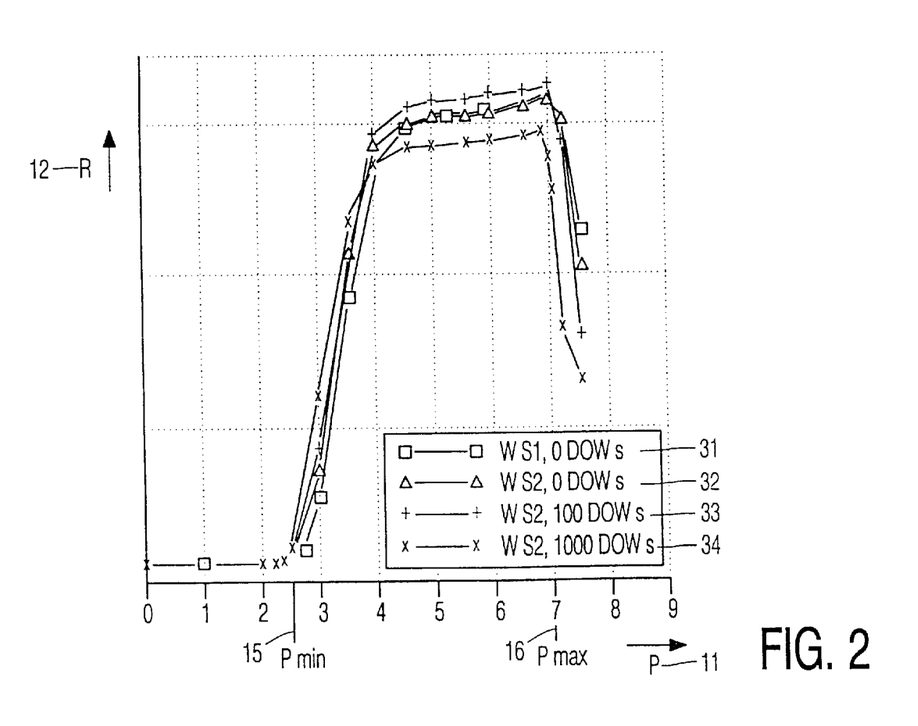
FIG. 2 is a graph showing examples of the results of a number of measurements of the normalized reflected power (R) as a function of the test power (P)

FIG. 2 is a graph showing examples of the results of a number of measurements (31 through 34) of the normalized reflected power, R, (12) as a function of the test power, P, (11) in arbitrary units. In measurement 31, a write method for providing marks in the preparatory step is used, which deviates from the write method used in measurements 32 through 34. The measurements 31 and 32 were performed on a record carrier on which no previous measurements had been performed. The measurements 33 and 34 were performed on a record carrier on which 100 previous measurements had been performed in measurement 33 and 1000 in measurement 34, at which the marks were always provided in the same position on the record carrier. The measurements shown in the graph prove that $P_{min}$ (15) and $P_{max}$ (16) are relatively independent of the write method used and of the number of times of performing the measurements on one and the same record carrier.

Figure 3:
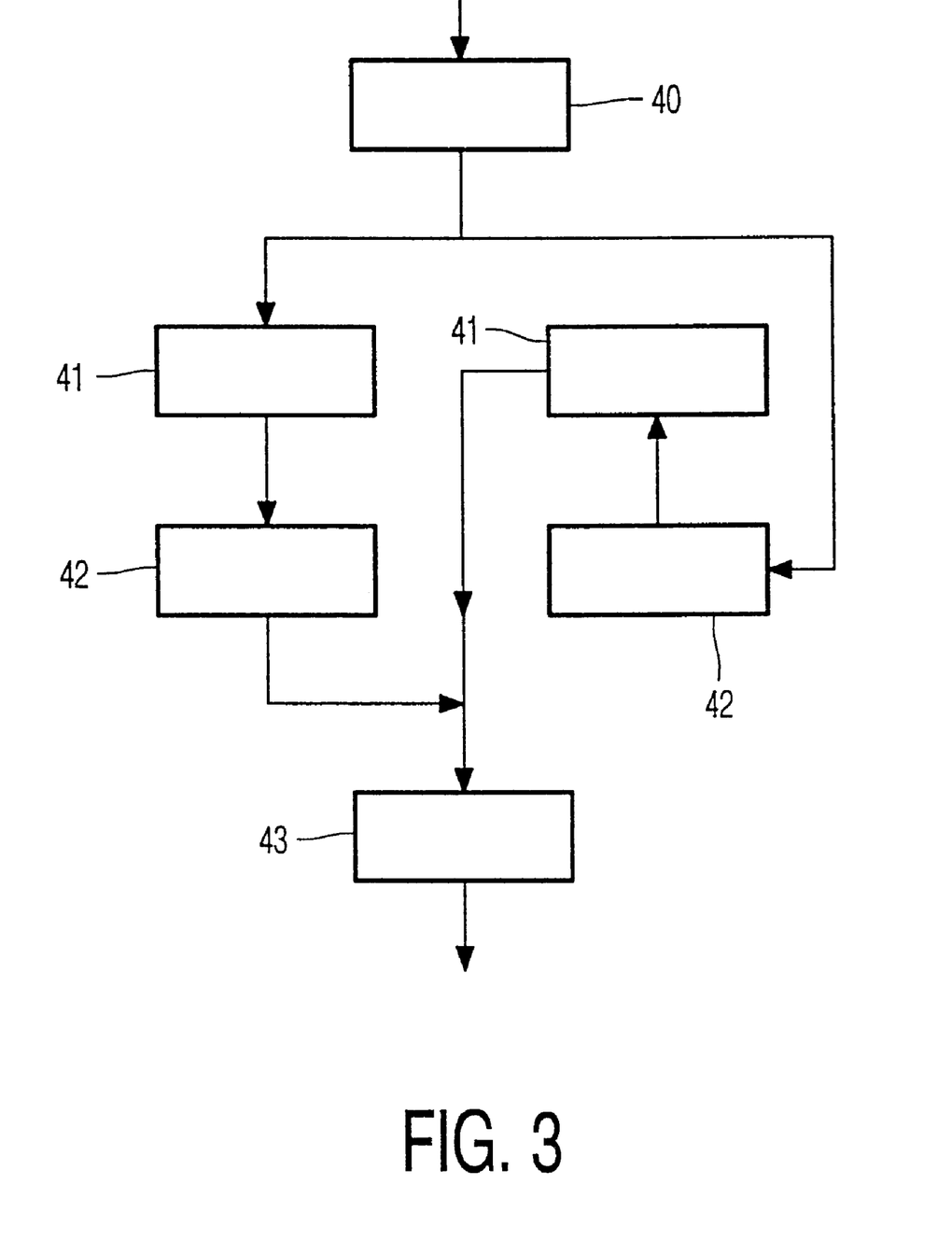
FIG. 3 shows a flow chart of a method according to the invention.

FIG. 3 shows a flow chart of a method according to the invention. In the preparatory step (40), marks are provided on the record carrier. Subsequently, the second power, $P_{min}$, can be determined in a first measuring step (41), followed by determining the third power, $P_{max}$, in a second measuring step (42). After the preparatory step (40), the third power, $P_{max}$, can be determined in a second measuring step (42), followed by determining the second power, $P_{min}$, in the first measuring step (41). When both measuring steps have been performed, the optimal value for the erase power and the write power, respectively, is determined in the comparison step (43).

Figure 4A:
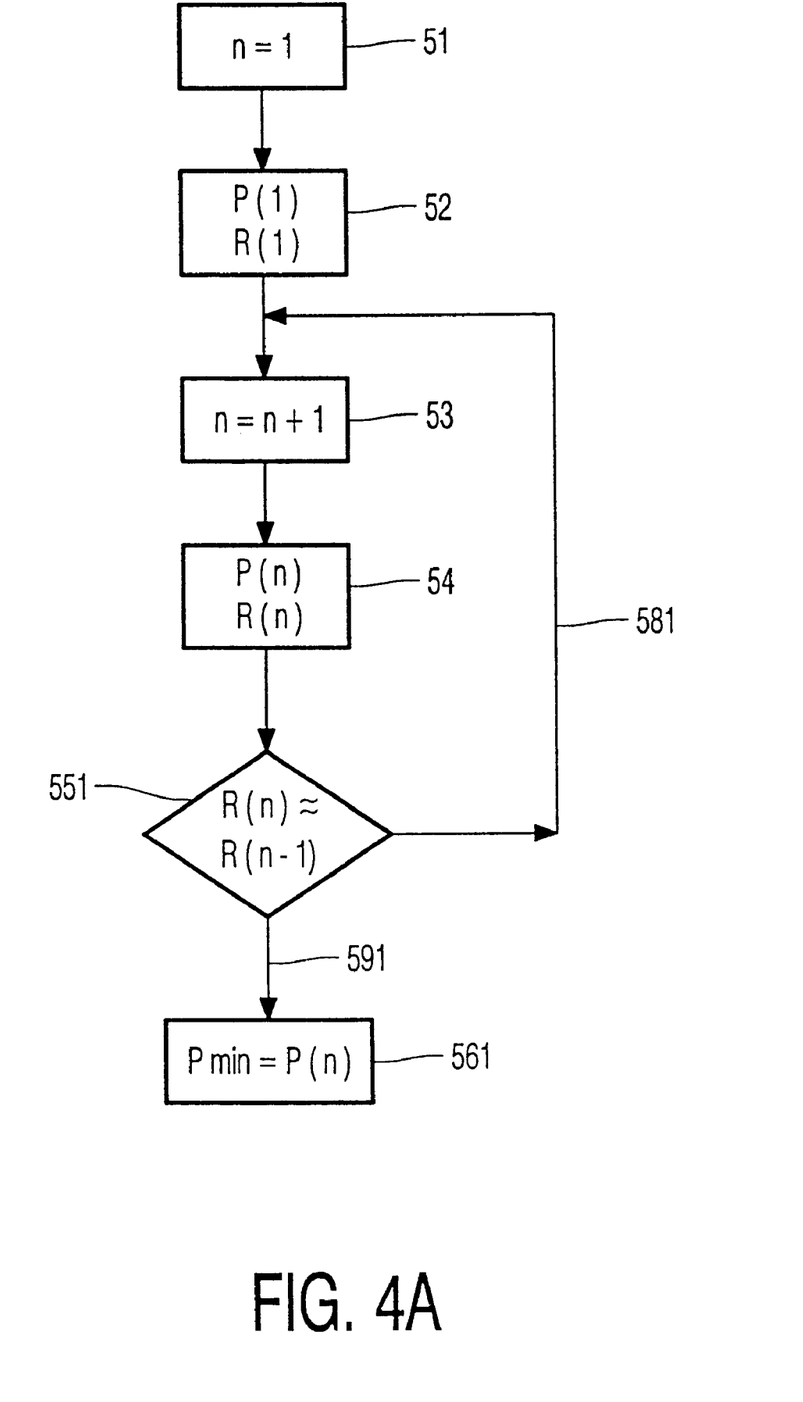
FIG. 4 shows flow charts of embodiments of a method according to the invention.
Figure 4B:
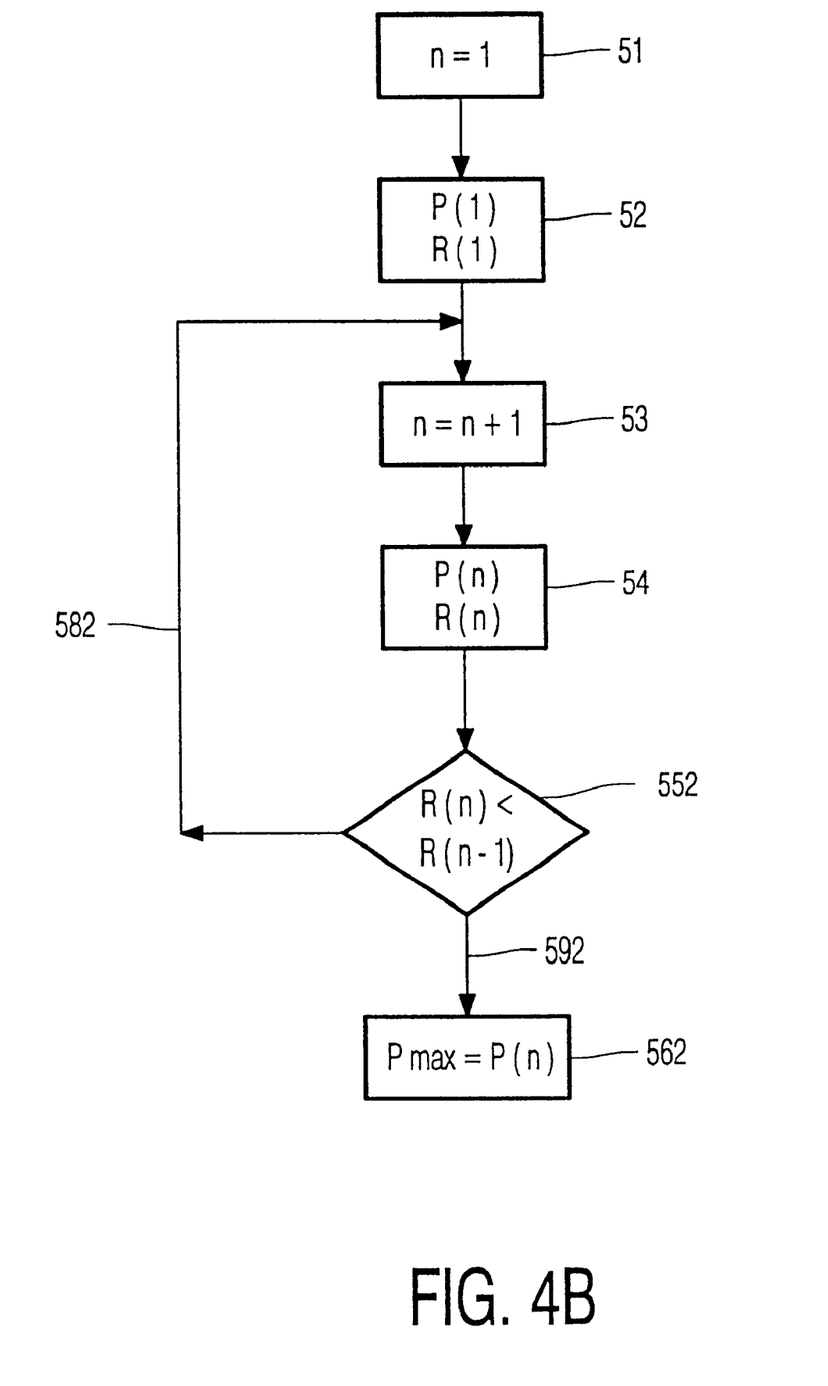

FIG. 4A shows a flow chart of an embodiment of the first measuring step (41) for determining $P_{min}$, and FIG. 4B shows a flow chart of an embodiment of the second measuring step (42) for determining $P_{max}$. In block 51, an initial value of 1 is allocated to a counter, n, which keeps track of the number of sub-steps performed. Subsequently, in block 52, the record carrier is irradiated at the location of the marks provided in the preparatory step (40) with radiation pulses having a test power of a selected value, P(1), and the normalized reflected power, R(1), associated with this test power is measured. In block 53, the counter, n, which keeps track of the number of sub-steps performed is raised by 1. In block 54, the record carrier is subsequently irradiated at the location of the marks provided in the preparatory step (40) with radiation pulses having a test power of a value P(n), in which P(n) is larger than the value of the test power in the previous step P(n−1), and the normalized reflected power, R(n), associated with this test power is measured.

In comparison block 551 in FIG. 4A, the normalized reflected power in the current sub-step, R(n), is compared with the normalized reflected power in the previous sub-step, R(n−1). If the two powers are substantially equal, the blocks 53 and 54 are repeated via path 581. If the two powers are not substantially equal, the value of the test power in the last sub-step, P(n), is allocated to $P_{min}$ in block 561 via path 591.

In comparison block 552 in FIG. 4B, the normalized reflected power in the current sub-step, R(n), is compared with the normalized reflected power in the previous sub-step, R(n−1). If the value of R(n) is smaller than the value of R(n−1), the value of the test power in the last sub-step, P(n), is allocated to $P_{max}$ in block 562 via path 592. If the value of R(n) is not smaller than the value of R(n−1), the blocks 53 and 54 are repeated via path 582.

Figure 5:
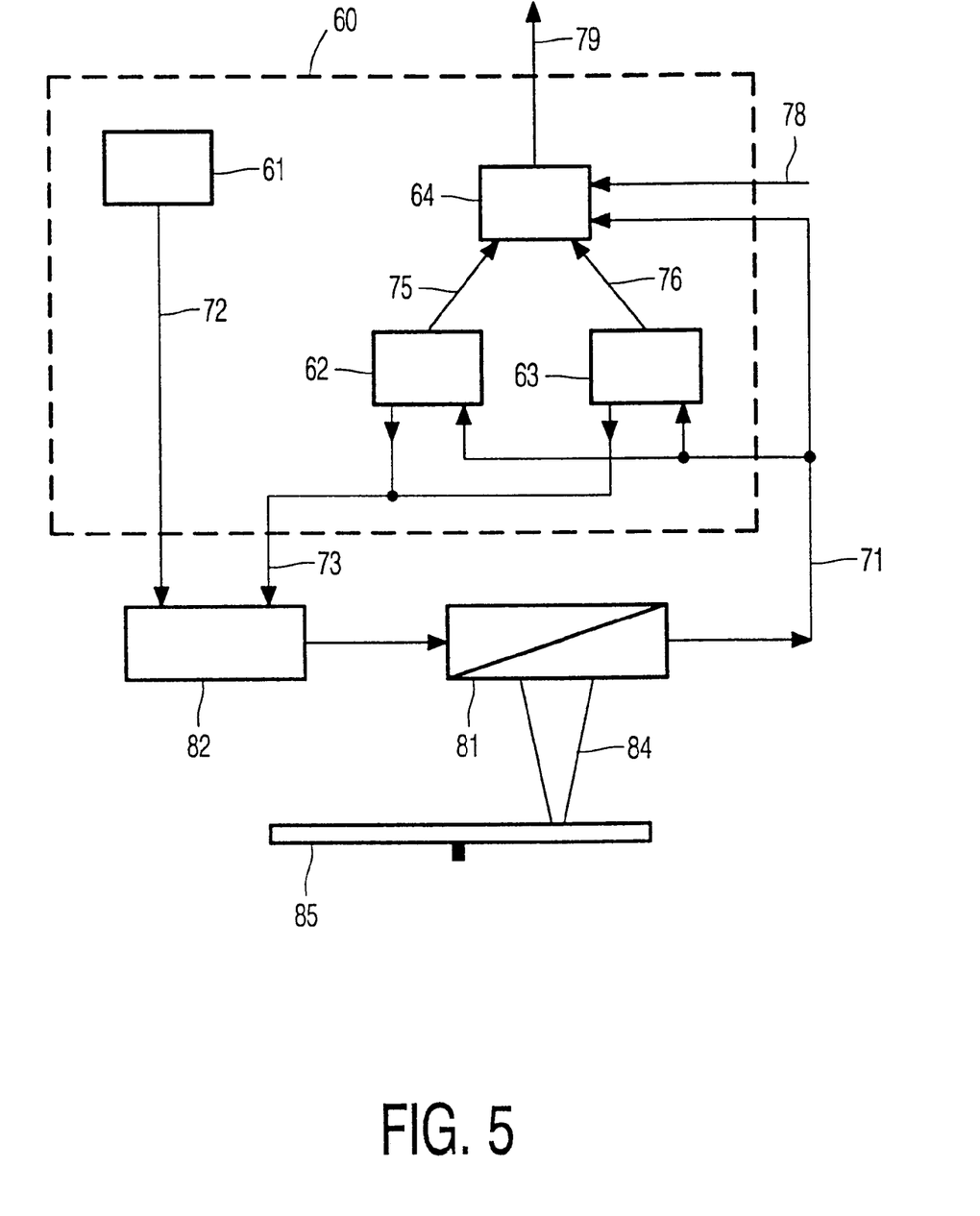
FIG. 5 is a block diagram of a calibration device in a recording apparatus according to the invention.

FIG. 5 is a block diagram of a calibration device (60) in a recording apparatus according to the invention. Block 81 shows an optical system in the recording apparatus, which optical system irradiates an optical record carrier (85) with radiation pulses (84) and receives reflected radiation pulses and converts them into an information signal (71). The optical system (81) is driven by a block (82) with control logics. This control logics block (82) controls, inter alia, the power of the radiation pulses (84). The calibration device (60) comprises a block (61) with control logics for performing the preparatory step in accordance with the inventive methods, a block (62) with control logics for performing a first measuring step in accordance with the invented methods, a block (63) with control logics for performing the second measuring step in accordance with the invented methods, and a block (64) with control logics for performing the comparison step in accordance with the invented methods.

Block 61 sends information to the control logics (82) via a control signal 72, which information is necessary for providing marks on the optical record carrier (85). Blocks 62 and 63 send information to the control logics (82) via control signal 73, which information is necessary for performing the measuring steps. Information signal (71) supplies the blocks 62 and 63 with information about the reflected radiation pulses. Block 62 supplies the result of the first measuring step via signal 75, and block 63 supplies the result of the second measuring step to block 64 via signal 76. This block 64 supplies the optimal erase power and the optimal write power, respectively, via signal 79 to the recording apparatus. Information about the parameters β and δ is obtained via information signal 71 from the optical record carrier (85), or via signal 78 from the recording apparatus.

What is claimed is:

1. A method of determining an optical modifying power for modifying the reflection of an area of a record carrier of the type in which marks are written by locally heating the record carrier with radiation pulses having a power higher than a minimum writing power sufficient to reduce the reflection of the radiation pulses, and the marks are erased by locally heating the record carrier at the marks with radiation pulses having a power, lower than the minimum writing power but higher than a minimum erase power which increases the reflection of radiation with respect to the marks, the method comprising the steps of:

writing test marks on the record carrier by locally heating the record carrier with radiation pulses having a power higher than the minimum writing power;

determining a minimum erase power ($P_{min}$) of the radiation pulses, at which the optical properties of the record carrier at the test marks do not substantially change when the record carrier is irradiated at a power which is lower than the minimum erase power, and the optical properties of the record carrier at the test marks change to such an extent that the normalized reflected power increases, when the record carrier is irradiated at a power which is higher than the minimum erase power;

determining a maximum erase power ($P_{max}$) of the radiation pulses, at which the optical properties of the record carrier at the test marks change when the record carrier is irradiated at the maximum erase power at the test marks, such that the normalized reflected power becomes maximal;

determining the optimal modifying power ($P_M$) from the equation $$P_M = \chi \cdot \frac{(P_{min} + P_{max})}{\alpha}$$

in which α is a constant known in advance and χ is a variable which is dependent on properties of the record carrier.

2. The method of claim 1 in which the optimum modifying power is an optimum erasing power, $\chi=\beta$, and β is dependent on properties of the record carrier.

3. The method of claim 1 in which the optimum modifying power is an optimum writing power, $\chi=\beta*\delta$, and β and δ are dependent on properties of the record carrier.

4. The method of claim 1 in which determining the minimum erase power includes the steps of:

irradiating the record carrier at the written marks with radiation pulses having a selected test power;

repeating the irradiating step, with increasing test power in each consecutive irradiating step, until the normalized reflected power increases substantially; and setting the minimum erase power ($P_{min}$) to the test power of the last irradiating step.

5. The method of claim 1, in which determining the maximum erase power includes the steps of:

irradiating the record carrier at the written marks with radiation pulses having a selected test power;

repeating the irradiating step, with increasing test power in each consecutive irradiating step, until the normalized reflected power decreases substantially; and setting the maximum erase power (Pmax) to the test power of the last irradiating step.

6. The method of claim 1, in which the test marks are of a maximum length allowed by the applied coding method.

7. The method of claim 6, in which the test marks are coded with an Ill carrier in accordance with the EFM+ (Eight-to-Fourteen Modulation Plus) coding method.

8. The method of claim 1, in which the test marks are provided in selected distinguishable areas.

9. The method of claim 8 in which the selected distinguishable areas are evenly spread across the surface of the record carrier.

10. The method of claim 1, in which a has a value of 2.

11. The method of claim 2, in which β has a value from 0.7 to 1.3.

12. The method of claim 3, in which β has a value from 0.7 to 1.3.

13. The method of claim 2, in which β is read from an area of the record carrier which is reserved for properties of the record carrier.

14. The method of claim 3, in which β is read from an area of the record carrier which is reserved for properties of the record carrier.

15. The method of claim 3, in which δ is read from an area of the record carrier which is reserved for properties of the record carrier.

16. The method of claim 1 in which:

the optimum modifying power is an optimum erasing power, $\chi=\beta$, and β is dependent on properties of the record carrier;

determining the minimum erase power includes the steps of: irradiating the record carrier at the written marks with radiation pulses having a selected test power; repeating the irradiating step, with increasing test power in each consecutive irradiating step, until the normalized reflected power increases substantially; and setting the minimum erase power (Pmin) to the test power of the last irradiating step;

determining the maximum erase power includes the steps of: irradiating the record carrier at the written marks with radiation pulses having a selected test power; repeating the irradiating step, with increasing test power in each consecutive irradiating step, until the normalized reflected power decreases substantially; and setting the maximum erase power (Pmax) to the test power of the last irradiating step;

the test marks are of a maximum length allowed by the applied coding method;

the test marks are coded with an I11 carrier in accordance with the EFM+ (Eight-to-Fourteen Modulation Plus) coding method;

the test marks are provided in selected distinguishable areas;

the selected distinguishable areas are evenly spread across the surface of the record carrier;

α has a value of 2;

β has a value from 0.7 to 1.3; and

β is read from an area of the record carrier which is reserved for properties of the record carrier.

17. The method of claim 1 in which:

the optimum modifying power is an optimum writing power, $\chi=\beta*\delta$, and β and δ are dependent on properties of the record carrier;

determining the minimum erase power includes the steps of: irradiating the record carrier at the written marks with radiation pulses having a selected test power; repeating the irradiating step, with increasing test power in each consecutive irradiating step, until the normalized reflected power increases substantially; and setting the minimum erase power (Pmin) to the test power of the last irradiating step;

determining the maximum erase power includes the steps of: irradiating the record carrier at the written marks with radiation pulses having a selected test power; repeating the irradiating step, with increasing test power in each consecutive irradiating step, until the normalized reflected power decreases substantially; and setting the maximum erase power (Pmax) to the test power of the last irradiating step;

the test marks are of a maximum length allowed by the applied coding method;

the test marks are coded with an I11 carrier in accordance with the EFM+ (Eight-to-Fourteen Modulation Plus) coding method;

the test marks are provided in selected distinguishable areas;

the selected distinguishable areas are evenly spread across the surface of the record carrier;

α has a value of 2;

β has a value from 0.7 to 1.3;

β is read from an area of the record carrier which is reserved fore properties of the record carrier; and δ is read from an area of the record carrier which is reserved for properties of the record carrier.

18. A recorder for writing marks by locally heating a record carrier with radiation pulses having a power higher than a minimum writing power sufficient to reduce the reflection of the radiation pulses from the record carrier, and for erasing the marks by locally heating the record carrier at the marks with radiation pulses having a power, lower than the minimum writing power but higher than a minimum erase power, sufficient to increase the reflection of radiation from the record carrier at the marks, the recorder comprising:

means for determining a minimum erase power (Pmin) of the radiation pulses, at which the optical properties of the record carrier at test marks written on the record carrier do not substantially change when the record carrier is irradiated at a power which is lower than the minimum erase power, and the optical properties of the record carrier at the test marks change to such an extent that the normalized reflected power increases, when the record carrier is irradiated at a power which is higher than the minimum erase power;

means for determining a maximum erase power ($P_{max}$) of the radiation pulses, at which the optical properties of the record carrier at the test marks change when the record carrier is irradiated at the maximum erase power at the test marks, such that the normalized reflected power becomes maximal;

means for determining the optimal modifying power ($P_M$) from the equation $$P_M = \chi \cdot \frac{(P_{min} + P_{max})}{\alpha}$$

in which α is a constant known in advance and $\chi$ is a variable which is dependent on properties of the record carrier.

19. The recorder of claim 18 in which:

the optimum modifying power is an optimum erasing power, $\chi=\beta$, and β is dependent on properties of the record carrier;

determining the minimum erase power includes the steps of: irradiating the record carrier at the written marks with radiation pulses having a selected test power; repeating the irradiating step, with increasing test power in each consecutive irradiating step, until the normalized reflected power increases substantially; and setting the minimum erase power (Pmin) to the test power of the last irradiating step;

determining the maximum erase power includes the steps of: irradiating the record carrier at the written marks with radiation pulses having a selected test power; repeating the irradiating step, with increasing test power in each consecutive irradiating step, until the normalized reflected power decreases substantially; and setting the maximum erase power ($P_{max}$) to the test power of the last irradiating step;

the test marks are of a maximum length allowed by the applied coding method;

the test marks are coded with an I11 carrier in accordance with the EFM+ (Eight-to-Fourteen Modulation Plus) coding method;

the test marks are provided in selected distinguishable areas;

the selected distinguishable areas are evenly spread across the surface of the record carrier;

α has a value of 2;

β has a value from 0.7 to 1.3; and

β is read from an area of the record carrier which is reserved for properties of the record carrier.

20. The method of claim 1 in which:

the optimum modifying power is an optimum writing power, $\chi=\beta\delta$, and β and δ are dependent on properties of the record carrier;

determining the minimum erase power includes the steps of: irradiating the record carrier at the written marks with radiation pulses having a selected test power; repeating the irradiating step, with increasing test power in each consecutive irradiating step, until the normalized reflected power increases substantially; and setting the minimum erase power (Pmin) co the test power of the last irradiating step;

determining the maximum erase power includes the steps of: irradiating the record carrier at the written marks with radiation pulses having a selected test power; repeating the irradiating step, with increasing test power in each consecutive irradiating step, until the normalized reflected power decreases substantially; and setting the maximum erase power (Pmax) to the test power of the last irradiating step;

the test marks are of a maximum length allowed by the applied coding method;

the test marks are coded with an I11 carrier in accordance with the RFM+ (Eight-to-Fourteen Modulation Plus) coding method;

the test marks are provided in selected distinguishable areas;

the selected distinguishable areas are evenly spread across the surface of the record carrier;

$\alpha$ has a value of 2;

$\beta$ has a value from 0.7 to 1.3;

$\beta$ is read from an area of the record carrier which is reserved for properties of the record carrier; and $\delta$ is read from an area of the record carrier which is reserved for properties of the record carrier.

* * * * *